INVENTOR.
FRED N. SINGDALE
BY *Fred N. Singdale*

ATTORNEY

Nov. 29, 1955   F. N. SINGDALE   2,724,964
METHOD OF DETERMINING STRAIN VALUES IN RIGID ARTICLES
Filed Sept. 2, 1952   2 Sheets-Sheet 2

INVENTOR.
FRED N. SINGDALE
BY Fred N. Singdale

ATTORNEY

United States Patent Office 2,724,964
Patented Nov. 29, 1955

2,724,964

METHOD OF DETERMINING STRAIN VALUES IN RIGID ARTICLES

Fred N. Singdale, Arcadia, Calif., assignor to Magnaflux Corporation, Chicago, Ill., a corporation of Delaware Application September 2, 1952, Serial No. 307,521

3 Claims. (Cl. 73—88)

This invention relates to a method for determining the direction of strains in rigid articles resulting from both tensile and compressive stresses. It also relates to a method for determining the comparative strain concentration and the relative value of strain concentration between different areas of the article as well as the absolute value of such strains. It further relates to coatings used in the stated processes.

The value of information as to the relative strain concentration and absolute value of strain to which various areas of manufactured parts are subjected in operation is well recognized for solving design problems. It is well known that the course of fatigue cracks, or other failures due to dynamic operating loads are determined by local concentrations of the strains resulting from the dynamic loads, such concentrations in turn being caused by abrupt changes in cross-sectional area such as grooves, ribs, fillets and others. Information as to the relative concentration, direction and actual magnitude of strains in various areas of machine parts is therefore an important criteria in the design of these parts. This information enables the solution of such problems as improperly distributed weight in a moving part, improperly positioned fillet reliefs, improper balance and many others.

Various methods such as the use of strain gages, static tests, models, X-ray diffraction measurements, and others have been used for strain determinations. All of these methods are subject to certain disadvantages. For example, the use of static tests sometimes results in the destruction of the part, models give only a rough approximation, and the use of strain gages and X-ray diffraction pattern measurements involve expensive apparatus and are not susceptible of application by untrained operators.

By far the most successful method of strain determination available to date using coatings involves the application of a brittle coating to the surface of the part to be tested, followed by stressing the part to form a strain pattern in the coating and determining the relative strain concentration and absolute value of the strain by assessing the strain pattern, the characteristics of the pattern being a relative indication of the strain resulting in the areas beneath the coating. Although the merits of this type process are well recognized in the art it has never been entirely practicable, and cannot be feasibly used to test parts under actual operating conditions, because a suitable coating material has not been found.

The most acceptable coating materials in use to date are brittle lacquers. These coatings are subject to a number of disadvantages which seriously limit their application. For example, they are extremely sensitive to temperature and humidity changes, so that any one composition is operative only within a relatively limited range of temperature and humidity conditions, necessitating their application and the testing of the part under carefully controlled conditions. The effect of this is that this type coating cannot be used to test a part under actual operating conditions in which the humidity and temperature is constantly changing and contaminating materials such as oil and vapors are present. Further, the operative range of temperature and humidity conditions for any one coating is too narrow to permit testing of a part under actual operating conditions. Also, this disadvantage eliminates the commercially attractive possibility of coating a manufactured part and storing it for an indefinite period in advance of testing. Brittle lacquer coatings are subject to the further disadvantages that the required evaporation of the solvent contained in them poses an extreme safety hazard during use; their compounding requires the careful selection of resin, solvent and plasticizer to prevent prohibitive amounts of crazing; their application requires a long time—often up to twenty-four hours; they are subject to plastic flow, thus requiring the time consuming application of a correction factor with attendant unreliability; and the property of uniform brittleness of these coatings is somewhat dependent upon their thickness.

Processes using the broad application of a brittle coating for strain determination are old, having been described in the literature as early as 1932. Modifications of this broad principle such as the development of brittle lacquers said to possess characteristics more favorable to the process, the application of stress loads in a manner suitable to a particular lacquer and the use of various improvements for detecting the cracks formed in the coating are later developments.

It is an object of this invention to provide a method for determining the relative value of strain concentration between different areas of metal parts and the absolute value of strain in metal parts resulting from both tensile and compressive stresses, which is relatively independent of temperature and humidity conditions.

It is another object of this invention to provide a method as stated above which is safe and practical in operation and does not require the services of highly skilled personnel in its application.

It is still another object of this invention to provide a method as stated above which permits coating and storage of a part for an indefinite period prior to testing.

It is a further object of this invention to provide a method as stated above which permits testing of a part under actual operating conditions.

It is a still further object of this invention to provide a method for determining the stress to which a part is subjected under operating conditions.

Other objects and advantages of the instant invention will be apparent to those skilled in the art from the following disclosure and discussion of the annexed sheets of drawings.

Figure 1:
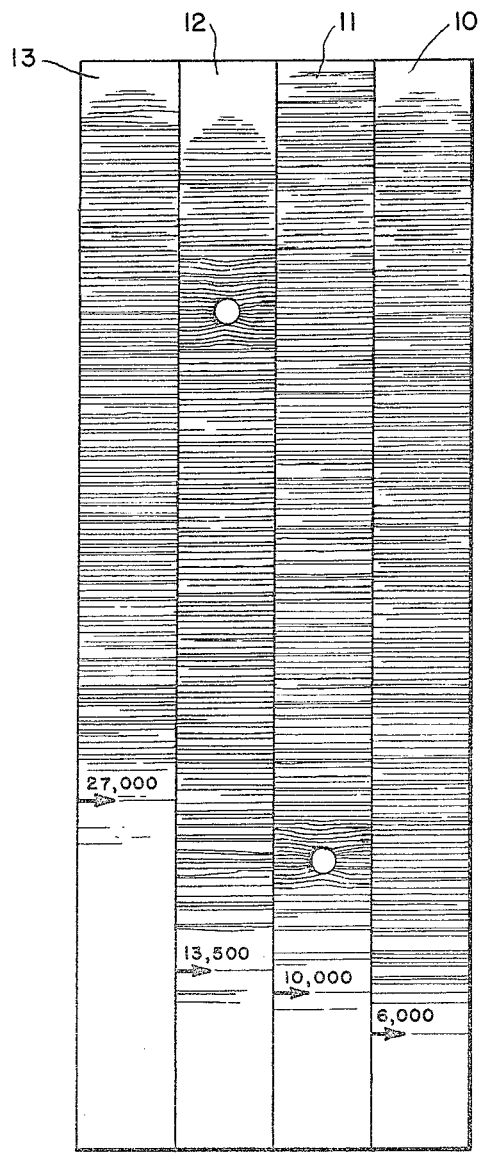
Figure 1 is an elevational view of standardized steel bars coated with different novel coating compositions of the instant invention, and showing the crack pattern formed by stressing same.

I have found that the above and other objects can be accomplished and the enumerated difficulties overcome by heat bonding to the part to be tested a vitreous or ceramic coating having a coefficient of expansion different from that of the metal being tested, applying stress to the part and assessing the resulting strain pattern produced in the coating.

As the strain pattern formed in the coating of this invention is continuous and, therefore, the concentration of cracks forming the pattern over a particular area is directly proportional to the strain in that area, the comparative strain concentration as between various areas is readily ascertained by comparison of the crack patterns.

The method of determining the relative value of strain concentration between various areas is based on the fact that initial crack formation in the coating of the invention occurs within a comparatively narrow range of strain values. According to the method, the part is stressed by the application of gradually increasing loads and the load required to form the initial crack in the various areas noted. Continued loading will reveal the areas of strain concentration as the cracks will become more concentrated in these areas. However, in practically all applications initial cracking will occur in all areas of strain concentration before it occurs in intervening areas in which strain concentration does not occur. As the initial crack value of a particular coating does not change, the load required to form the initial crack in an area in which strain concentration does not occur can be taken as unity and this figure divided by the loads required to form the initial crack in areas of strain concentration to give the relative value of strain concentration as between areas of strain concentration and areas which show no strain concentration. The narrow range of values within which the initial crack forms and the independence of crack formation to local thickness of the coating make possible the determination of relatively small differences in strain concentration between areas. This is in contrast to brittle lacquer coatings of the prior art which crack within such a wide range of strain values that this method cannot be used with them.

The initial crack value may be defined as the stress load in pounds per square inch required to form the first crack in a coating of a given coefficient of expansion applied to a particular metal. When it is not practicable to use the first crack, as in the case of a large pattern or when observation is impracticable, the last crack formed in the pattern can be used. The initial crack value can be determined by applying a strain gage to an area of a coated article free of strain concentration, and calculating the strain value at which the first crack forms between the gage points as the initial crack value of the coating. According to another method this determination is made by applying gradually increasing stress loads to a coated article until the first crack is formed and determining the value of strain in the cracked area by calculations based on the laws of elasticity.

It is pointed out that in calibrating a coating of this invention it is unnecessary to control temperature and humidity conditions. The calibration holds for all temperatures and humidity conditions within practical limits. This is in contrast to the calibration of brittle lacquer coatings wherein temperature and humidity conditions must be carefully controlled and a calibration is reliable only when the coating is used under the conditions existing during calibration. Consequently, any calibration process applied to brittle lacquers is valid only when restricted by these essential limitations in contrast to one applied to vitreous or ceramic coatings of this invention.

For the determination of absolute strain values I may use either of two methods. According to one method the coating used is one which has been calibrated by the conventional method of applying it to a standardized strip of the same metal as that being tested and denoting to the strain pattern the known values of strain resulting in various areas when known stress loads are applied. Comparison of the strain pattern formed in the coating on the article being tested with the calibrated coating permits assessment of the absolute value.

According to the preferred method of determining absolute strain values in metal parts, adjacent areas, such as strips, of the areas to be tested are coated, each with coatings of different initial crack values for the particular metal, the upper and lower initial crack values forming an adequate range within which to determine the strain. After the stress load is applied and a crack pattern formed in the coatings having an initial crack value equal to and below that of the applied stress, the lower and upper limits within which the absolute value of the strain lies will obviously be defined by the highest initial crack value among the cracked coatings and the lowest initial crack value among the uncracked coatings. If more accurate values are required they are then obtained by interpolation using the strain pattern of the cracked coating having the highest initial crack value. This method is particularly adaptable for the determination of absolute strain values in a part under actual operating conditions.

If the value of strain resulting from tensile stress is being determined the coefficient of expansion of the coating must be more than that of the metal being tested, preferably from about one tenth greater to three times greater. For determining the value of strain resulting from compressive stress the calculated coefficient of expansion of the coating must be less than that of the metal being tested, preferably from one tenth less to three times less.

It is to be understood that as used in this specification and claims the term "bonding" means the heat fusion of a coating to the metal to form a coating-to-metal bond in the manner that a vitreous ceramic enamel-to-metal bond is formed, in contrast, for example, to the manner in which a brittle lacquer coating is adhered to metal. The term "metal" is used to include both metals and their alloys. The term "vitreous" is used in its broadest sense as defined in the vitreous enameling art and includes ceramic and porcelain coatings having the physical characteristics and properties desirable for use as coatings in the instant invention.

The present invention is based largely upon my discovery of the relation between the coefficient of thermal expansion of the metal being tested and the thermal coefficient of expansion of the applied coating which is required to give dependable results. I have found, as stated previously, that the coefficient of expansion of the coating must be different from that of the metal. This is true for two reasons. First, if the coefficients of expansion are equal the coating will not crack within the yield point of the metal. Second, it is a requirement that the bonded coating have an initial internal stress either compressive or tensile depending upon which type of strain is being tested. If the coefficient of expansion of the coating is greater than that of the metal, tensile stresses will be developed in the coating when the metal and coating cool, while if it is less than that of the metal compressive stresses will be developed upon cooling of metal and coating. The optimum range of values for the coefficient of expansion of the coating appears to be about one tenth more to about three times more than that of the metal for determination of both absolute and relative strain concentration values resulting from tensile stresses. The preferred upper limit appears to be about three times that of the coefficient of expansion of the metal as beyond this point it appears that the coating is too sensitive to give dependable results and it is subject to flaking off. The sensitivity decreases as the difference in coefficients of expansion decreases until at equal coefficients of expansion the coating will not crack within the elastic yield point of the metal. Likewise, in the case of strains resulting from compressive stresses, in which the coefficient of expansion of the coating must be less than that of the metal, the sensitivity to flaking increases as the difference in the coefficient of expansion of the coating and the coefficient of expansion of the metal increases and is too great beyond three to give dependable results. Below the lower limit of one tenth the coating is too insensitive to give reproducible results.

The strain pattern formed in the coating of this invention by the application of stresses to the coated part is continuous as contrasted with the cyclic patterns which are an alleged characteristic of some brittle lacquer coatings. Consequently the results are independent of the method of applying stresses, whereas the operativeness of coatings forming cyclic patterns is somewhat dependent upon the method of stress application.

In applying the process of the invention I have found it preferable to make a frit and add mill additions thereto to give a basic slip which produces a coating having a coefficient of expansion which will give a crack value near the lower limit of strain value which it is feasible to measure for the metal under test. The composition is then adjusted to provide slips giving coatings having higher crack values. The adjustment is made by the addition of lead borosilicate or an equivalent material for lowering the coefficient of expansion.

Example I

The metal strips, 10, 11, 12 and 13 of Fig. 1 of the drawings were coated with the compositions of this example. They are of cold rolled steel which has a coefficient of expansion of $6.5 \times 10^{-6}$ inch per inch per degree F. and their dimensions are $\frac{1}{4}'' \times 12'' \times 1''$.

A frit having the following composition was ground and thoroughly mixed.

| | Percent by weight |
|---|---|
| $TiO_2$ | 33.6 |
| $SiO_2$ | 28.1 |
| $ZnO$ | 14.4 |
| $PbO$ | 6.1 |
| $Na_2O$ | 17.5 |
| $K_2O$ | Trace |

The composition of this frit was adjusted with the following mill additions. The final composition produced a coating having a coefficient of expansion of approximately $17 \times 10^{-6}$ as determined by standard methods.

| | Percent by weight |
|---|---|
| $TiO_2$ | 20.0 |
| $SiO_2$ | 2.0 |
| $Na_2O$ | 2.1 |
| $PbO$ | 20.0 |
| $Na_2CO_3$ | 7.0 |

After milling, the slip was completed by the addition of enough water to make it suitable for spraying. The final adjustments to obtain coatings of varying coefficients of expansion, and therefore varying initial crack values, were made by adding amounts of lead borosilicate as follows:

| No. of strip | Initial crack value for steel (C/E—$6.5 \times 10^{-6}$) p. s. i. | Approximate C/E of coating | Lead borosilicate (percent combined wt. of frit and mill additions) |
|---|---|---|---|
| 10 | 6,000 | $17.5 \times 10^{-6}$ | 0 |
| 11 | 10,000 | $16.3 \times 10^{-6}$ | 10 |
| 12 | 13,500 | $15.5 \times 10^{-6}$ | 20 |
| 13 | 27,000 | $13.0 \times 10^{-6}$ | 40 |

The compositions were sprayed on the strips as shown in the table and fired on at a temperature of 1070° F. for 12 minutes to form a coating bonded to the metal. After cooling and storage for several days under varying conditions of temperature and humidity each of the strips was stressed by deforming it in the manner of a cantilever beam with known loads. The initial crack value was then determined by calculations based on the laws of elasticity. As is obvious the initial loading used is always below the crack value of the coating.

By reference to Fig. 1 it is noted that a continuous strain pattern is formed in the coatings, the points of maximum strain concentration, as indicated by the concentration of cracks, being located adjacent the holes, as would be expected. Thus it is seen that in order to determine the comparative strain concentration as between different areas of the stressed part it is only necessary to note the areas of maximum crack concentration. A trained operator can ascertain approximately, the relative values of strain concentration in an article by observation of and comparison of the crack patterns in various areas. This is of particular value in assessing strain resulting from dynamic loading.

If the relative value of strain concentration as between various areas of a strip is required it is obtained by stressing with gradually increasing loads and noting the load required to form the initial crack in the various areas of strain concentration. The relative values are then calculated as previously explained.

The cracks in the coated strips illustrate the feasibility of use of the last complete crack formed in the pattern for determining the initial crack value of a coating on a standard strip.

Referring again to the parts 10, 11, 12, and 13 of Fig. 1 it can be illustrated that a method is provided for calculating absolute strain values by the use of a number of coatings of different crack values. In practice the part is coated with a number of adjacent strips of coatings, which are analogous to the coated strips shown, of different initial crack values for the metal being tested, some of which are known to be above the strain which will result in the part and some of which are below the strain which will result. After application of the stress to form crack patterns in those coatings having initial crack values below or equal to the applied stress the absolute value of the applied stress is seen to lie within the limits defined by the initial crack value of the cracked coating having the highest initial crack value and that of the uncracked coating having the lowest initial crack value. Final assessment if necessary may be made by interpolation.

Figure 2:
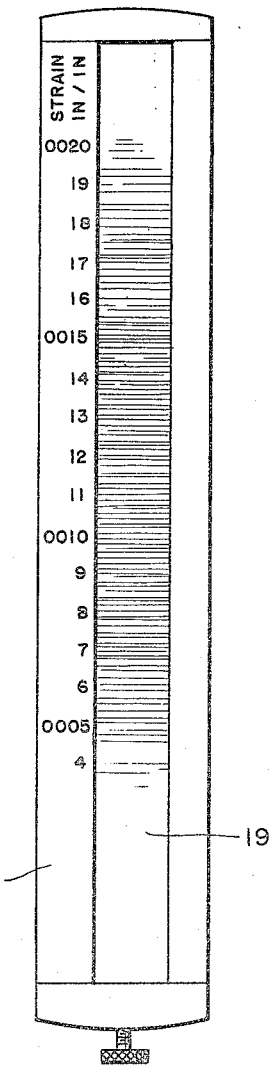
Figure 2 is an elevational view of a scale containing a standard strip for calibrating the strain pattern formed in the coatings of the instant invention.

Another method of determining absolute stress value comprises the comparison of the crack pattern formed with a calibrated pattern of the coating by use of a scale, according to the practice well known in the art. The method of calibration can be illustrated by reference to Fig. 2, an elevational view of a scale 18 containing a standard metal strip 19 for calibration of the strain pattern formed in the coating on the part. The strip was coated and a known load applied to form a strain pattern. When the strip was placed in the scale the value of the strain in any given area was calculated and this value noted on the scale, adjacent the area as shown. The readings on the scale shown are in microinches of expansion per inch per inch per degree F. but may be in pounds per square inch or other units.

The entire crack pattern can be calibrated in the above manner so that a calibration is obtained not only of the initial crack value of the coating for the particular metal but of the full crack pattern. This calibration can be used to obtain by comparison the absolute value of strain in any area of the same type metal coated with this composition.

Example II

Two strips of stainless steel (coefficient of expansion $11 \times 10^{-6}$ inch per inch per degree F.) were each coated with a coating formed from a slip made from the above frit. The coating had the following values:

| Lead borosilicate (percent combined wt. of frit and mill additions) | Initial crack value of coating for stainless steel (C/E—$11 \times 10^{-6}$) p. s. i. | Approximate C/E of coating |
|---|---|---|
| 0 | 30,000 | $17.5 \times 10^{-6}$ |
| 10 | 36,000 | $16.4 \times 10^{-6}$ |

The coatings were fired on as in Example I, the strips permitted to cool, and the parts stressed by the application of stress loads. Crack patterns similar to those shown in Fig. 1 were formed clearly showing areas of maximum strain concentration as well as the direction of the stress. Absolute values of strain were calculated by use of a strain scale and verified with strain gages.

As is noted from the two tables, the initial crack value of a coating varies with the metals to which it is applied. This, of course, is because the initial crack value of a particular coating is dependent upon the coefficient of expansion of the metal base as well as the composition of the coating. Accordingly, if the same composition is applied to different metals it must be calibrated for each metal. It is a distinct advantage of the invention that a composition can be made having a coefficient of expansion within the limits required for a number of metals so that the same composition can be used for testing any of these metals after it has been calibrated for each of them. The flexibility of the invention is illustrated by the fact that the above basic slip can be used to give final coatings suitable for determining strain values in all ferrous metals by the addition of the proper amount of lead borosilicate or other similar agents. Lead borosilicate has been found particularly adaptable for adjustment of the coefficient of expansion of coatings for the purpose of this invention.

Figure 3:
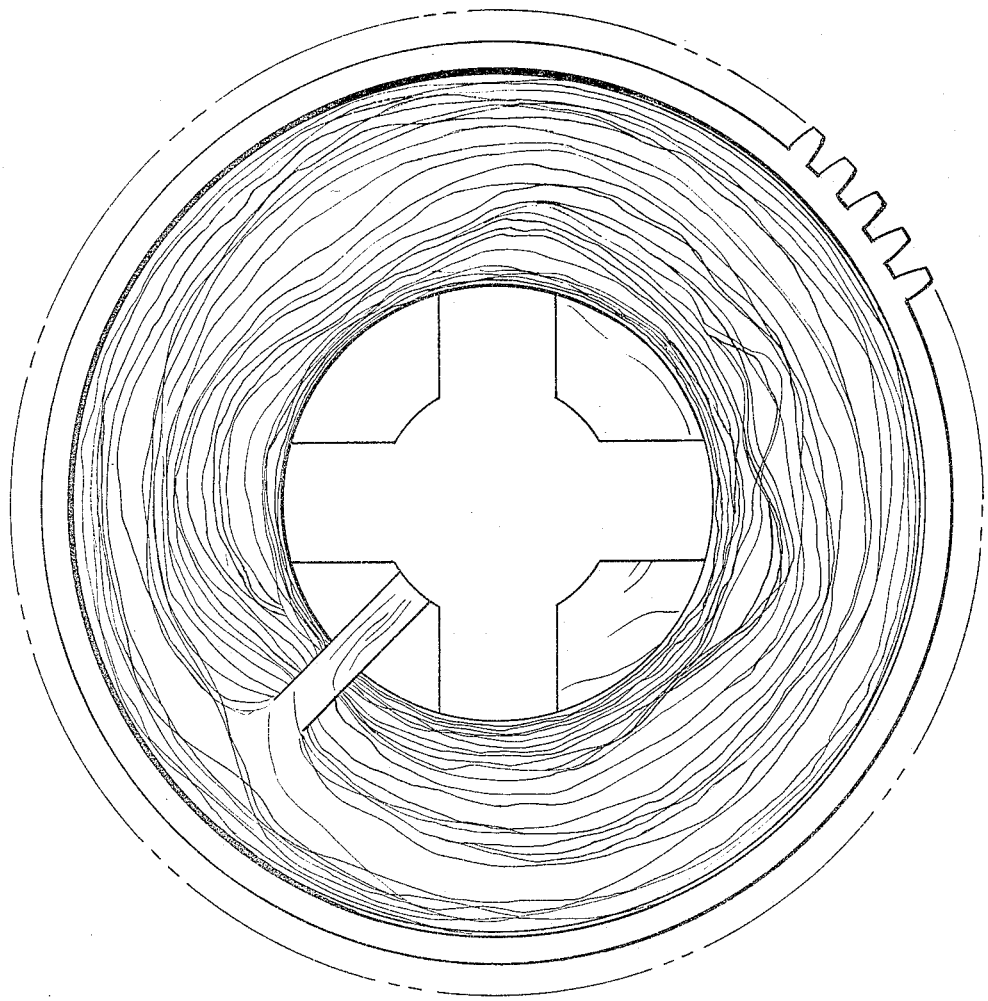
Figure 3 is an elevational view of a timing gear coated with the novel coating composition of the instant invention and showing the crack patterns developed under actual operating conditions.

Fig. 3 is a reproduction of a timing gear coated with an enamel composition of this invention and operated under actual operating conditions. The hub of the wheel was flush with the hub of the crankshaft. As is obvious the surface of the hub was not subjected to the same strain as the wheel itself. This is because it was a heavy section and partially supported by the mating surface. It will be noted that the greatest concentration of cracks is located near the center of the wheel as would be expected.

Examples of other compositions which have been found operable for steel are as follows:

Example III

FRIT

| No. | TiO$_2$, Wt. percent | SiO$_2$, Wt. percent | ZnO, Wt. percent | PbO, Wt. percent | Na$_2$O, Wt. percent | Na$_2$CO$_3$, Wt. percent | Na$_2$SiO$_3$, Wt. percent |
|---|---|---|---|---|---|---|---|
| 1 | 25.4 | 21.3 | 10.9 | 4.6 | 37.8 | | |
| 2 | 25.4 | 21.3 | 10.9 | 4.6 | 37.8 | | |

MILL ADDITIONS (PERCENT OF FRIT)

| 1 | 16.4 | 0 | 7.1 | 3.0 | | 25.6 | 47.8 |
| 2 | 17.9 | 7.1 | 7.7 | 3.0 | | 36.2 | 27.6 |

A modification of the invention includes the use of a coated strip in the manner of a strain gage. For example, a strip with a calibrated coating thereon is attached by spot welding or otherwise to a part to be tested in a manner so that the strain in the part being tested will be accurately reflected in the strip and the strain measured by this means without actually coating the object. This modification permits the manufacture of calibrated strips for use as strain gages to test parts without actually coating them.

While the above examples are illustrative of my invention they are by no means intended to be limiting. For example, it is possible to vary the percentage compositions of frit, mill additions and lead borosilicate, the requirement being that the final composition be such that it produces a bonded coating having a coefficient of expansion different from that of the metal being tested, the actual value of the coefficient of expansion depending upon whether tensile or compressive strain values are desired. Various equivalents for the ingredients of the final composition, which are well known in the vitreous enamel art, may be substituted for those given in the examples with the requirement stated above. However, any substitution of a component of the slip or a substitution in the amount of a component must be accompanied by a suitable adjustment in the amount of the remaining components to give the required coefficient of expansion. While the above examples are illustrative of my invention as applied to ferrous metal it is by no means limited to this type metal but may be applied to other metals and their alloys such as aluminum and its alloys, and many others, the requirement being that the base be one to which the coating can be bonded. While water is the preferred vehicle for the slip, other vehicles may obviously be used.

As is seen from the figures of the drawing, the crack pattern is continuous and well defined. The cracks are formed normal to the direction of stress so that they indicate the direction as well as magnitude of the stress. The crack pattern is consistent regardless of the thickness of the coating and forms cracks within a narrow range of strain values. The cracks formed have sufficient internal stress to prevent their closing so that no procedure for reopening them is necessary. When required, cracks may be detected by conventional methods such as staining the cracks with a dye having a different color from that of the coating. Other conventional detection methods may be used. Although there are no practical limits to the thickness of the coating the preferred thickness is .003–.005 inch. The sensitivity of the coating is not affected within practical limits by its thickness or by temperature or humidity conditions. As explained previously the sensitivity of the coating is controlled by the relation between its coefficient of expansion and the coefficient of expansion of the metal base.

The coating formed has good adherence, is insensitive to rough handling and will not crack or craze with temperature and humidity changes. This makes feasible the coating and storage of a part for an indefinite time prior to testing.

The coating may be applied by brushing, spraying or other conventional methods. It may be fired on by baking, induction heating methods, resistance heating methods and others. When applied by firing, the preferred method, the time is surprisingly short. As an example, a suitable coating may be fired on a metal piece ¼" x 12" x 1" in 12 minutes at 1070° F., as compared to brittle lacquer coatings which often require up to 16 or 20 hours for drying alone.

The article to be coated may be cleaned before application of the coating by conventional methods such as sandblasting, pickling or others. It is a distinct advantage of this coating that it is practically impervious to contamination by oil and certain other contaminants ordinarily encountered under operating conditions.

The process of this invention is equally effective for determining strain values regardless of the nature of the applied stress whether it results from dynamic loading, static loading, impact loading, incremental loading or other type loading.

As the initial crack value of a particular coating varies with the coefficient of expansion of the coating, and since it is possible to vary the coefficient of expansion of the coating, a coating of any desired initial crack value can be obtained for a particular metal so that all strain values within practical limits can be calculated by use of the method.

The coating does not contain any solvents subject to removal by evaporation with resultant noxious fumes, and therefore its use does not subject operating personnel to safety hazards.

Further, the disadvantage of crazing after application, which is characteristic of the prior art coatings, is non-existent when the coating of this method is used. The spontaneous crazing problem is removed as this coating is impervious to cracking under wide temperature and humidity changes whereas prior art brittle lacquer coatings are subject to spontaneous crazing upon four or five degrees temperature change, thus necessitating their use soon after application or storage of the coated part under carefully controlled temperature and humidity conditions.

The present method is believed to be the only one available which permits testing of a part in actual operation or the determination of the value of stress to which a part is subjected in operation. This is difficult with methods utilizing brittle lacquer coatings as that type of coating is extremely sensitive to contaminants present under operating conditions and to temperature and humidity changes.

In order to apply the invention it is only necessary to compound a slip which produces a coating having a coefficient of expansion different from that of the metal being tested, the actual difference being dependent upon whether the strains to be assessed result from tensile or compressive stresses. Following this, the coating is applied to a part and the part subjected to stresses in any manner to form a strain pattern. Comparative strain between different areas is revealed by comparison of the crack pattern in the areas. Relative strain values in different areas are determined by the relative concentration of cracks in the various areas or by noting the relative stresses required to form the initial crack in the various areas. Absolute strain values may be determined from the crack pattern by use of a scale or they can be obtained by use of adjacent strips of coating of varying initial crack values as explained above. The invention includes the use of metal strips coated with calibrated coatings to be used as strain gages to avoid actually coating the part being tested.

It is thus seen that there has been provided a method for determining relative and absolute strain values which is economically feasible, highly accurate and is possessed of many other advantages not present in prior art processes.

While the invention has been described for use in coating metals it will be apparent that the coating may be employed on any materials to which it will bond. Obviously many modifications and variations of the present invention are possible in the light of the above teachings. It is therefore to be understood that within the scope of the appended claims the invention may be practiced otherwise than as specifically described.

Having now described my invention, what I claim is:

1. A method for determining the distribution of strain values in a rigid article resulting from tensile stresses in said article, which comprises: coating said article with a vitreous composition having a coefficient of expansion of from about 0.1 to 3 times greater than the coefficient of expansion of said article; heating said article to heat-bond said vitreous coating thereto; cooling said article to develop initial tensile stresses in said coating, and stressing said article to form a crack pattern in said coating from which the strain values in said article may be computed.

2. A method for determining the distribution of strain values in a rigid article resulting from compressive stresses in said article, which comprises: coating said article with a vitreous composition having a coefficient of expansion of from 0.1 to 3 times less than that of said article; heating said article to heat-bond said vitreous coating thereto; cooling said article to develop initial compressive stresses in said coating, and stressing said article to form a crack pattern in said coating from which the strain values in said article may be computed.

3. The process of quantitatively determining the strain values in a rigid metal article subjected to tensile stress, which comprises: coating said article with a plurality of adjacent strips of a vitreous composition wherein each strip has a coefficient of expansion of from about 0.1 to 3 times greater than that of the metal article being tested, and each strip having a predetermined initial crack value differing from that of the other strips, wherein the upper and lower crack values form limits within which the value of the applied stress will lie; heating said article to bond said vitreous strips thereto; cooling said article to develop initial tensile stresses in said strips; and stressing said article whereby cracks are formed in those coatings having an initial crack value equal to and below the value of applied stress thereby defining the upper and lower limits between which the absolute value of stress lies, whereby the final value of stress may be calculated by interpolation based on the crack pattern of the cracked coating strip having the highest initial crack value.

References Cited in the file of this patent

UNITED STATES PATENTS

| | | |
|---|---|---|
| 1,734,698 | Trenzen | Nov. 5, 1929 |
| 1,783,740 | McKeown | Dec. 2, 1930 |
| 2,294,897 | Ellis | Sept. 8, 1942 |
| 2,310,845 | Ellis | Feb. 9, 1943 |
| 2,475,469 | Bennett et al. | July 5, 1949 |
| 2,608,490 | Donahey | Aug. 26, 1952 |